United States Patent [19]

Holzner et al.

[11] Patent Number: 4,558,410
[45] Date of Patent: Dec. 10, 1985

[54] MICROCOMPUTER SYSTEM FOR HIGH-SPEED LOCATION OF BLOCKS OF CHARACTERISTICS

[75] Inventors: Peter Holzner, Germering; Werner Sedlmeier, Munich, both of Fed. Rep. of Germany

[73] Assignee: Siemens Aktiengesellschaft, Berlin & Munich, Fed. Rep. of Germany

[21] Appl. No.: 342,897

[22] Filed: Jan. 26, 1982

[30] Foreign Application Priority Data

Feb. 11, 1981 [DE] Fed. Rep. of Germany ....... 3104941

[51] Int. Cl.$^4$ .............................................. G06F 9/00
[52] U.S. Cl. .................................................. 364/200
[58] Field of Search ... 364/200 MS File, 900 MS File, 364/200, 900

[56] References Cited

U.S. PATENT DOCUMENTS

| 2,884,616 | 4/1959 | Fillebrown et al. | 340/149 |
| 3,319,224 | 5/1967 | Ulrich | 340/146.2 |
| 4,168,541 | 9/1979 | DeKarske | 364/200 |

FOREIGN PATENT DOCUMENTS

| 132690 | 10/1978 | Fed. Rep. of Germany | 2/51 |
| 140179 | 2/1980 | Fed. Rep. of Germany | 3/51 |

OTHER PUBLICATIONS

Siemens, "SAB 8085 Microcomputer User's Manual", pp. A1-6 and A1-7.
"The Hybrid Associative Memory Concept", by Arnold Weinberger, Computer Design, Jan. 1971, pp. 77-85.
"Application of Content-Addressed Memory For Dynamic Storage Allocation", RCA Review, Mar. 1965, pp. 140-152.
"Associative Memories, Content-Addressed Memories, Programmable Logic Arrays-An Attempt to Define These Terms", Elektronische Rechenanlagen, Jan. 19, 1977, pp. 274-283.

*Primary Examiner*—Gareth D. Shaw
*Assistant Examiner*—John G. Mills
*Attorney, Agent, or Firm*—Hill, Van Santen, Steadman & Simpson

[57] ABSTRACT

A micro-computer system for data processing and for the rapid location of a characteristic block has a working store which is organized so that it can be used as a conventional working store with a data width of, for example, one byte. This working store contains a data file storage zone for storing, along with other data, a plurality of blocks of multi-byte characteristics. Several read-write stores, all of which contain one or more bytes of the block of characteristics, are read out simultaneously, while the data ports of the read-write stores are cut off from the data bus. The comparison with the combinations searched for is carried out via comparators which compare the data read from the read-write stores with the combinations searched for, which are intermediately stored. The outputs of the comparators are connected to the inputs of an AND gate which produces an identity signal which terminates the searching.

7 Claims, 4 Drawing Figures

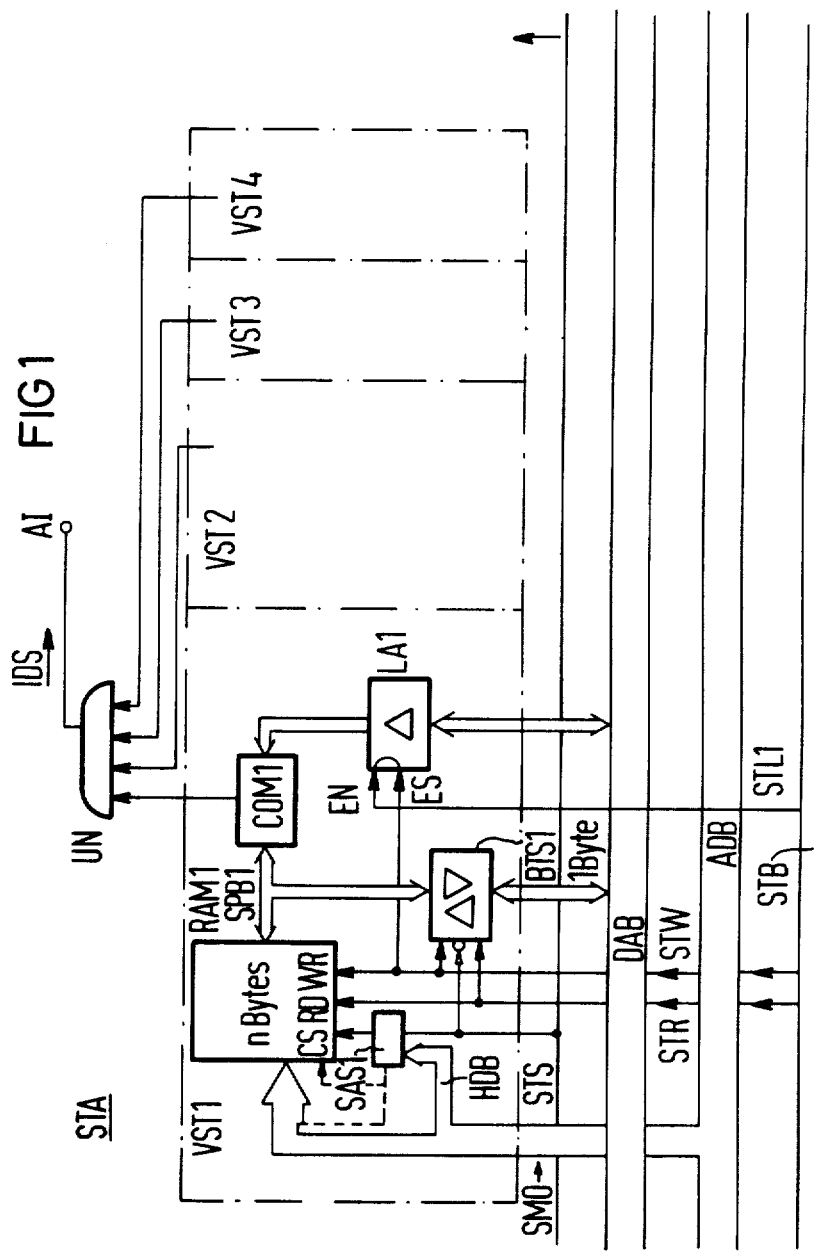

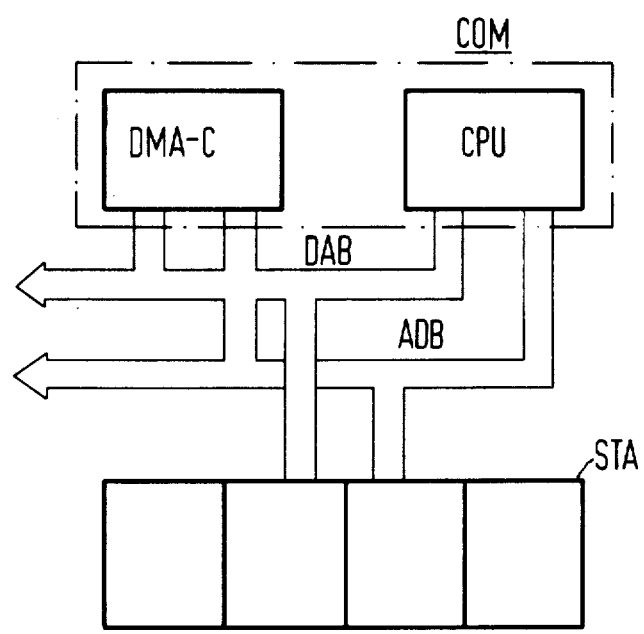

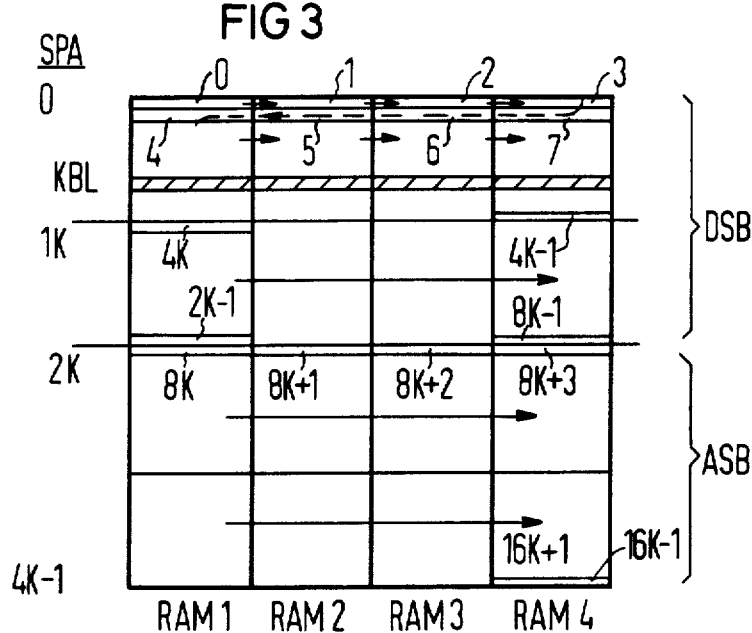
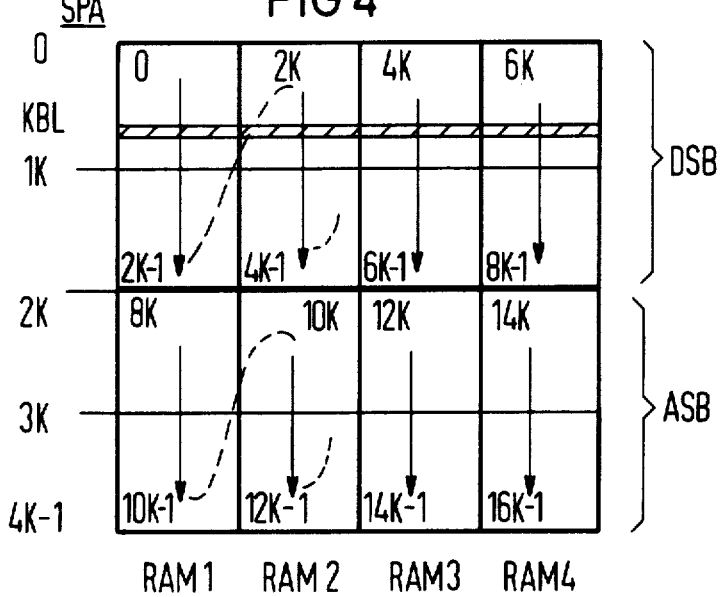

MICROCOMPUTER SYSTEM FOR HIGH-SPEED LOCATION OF BLOCKS OF CHARACTERISTICS

BACKGROUND OF THE INVENTION

1. Field of the Invention

The present invention relates to microcomputer systems for data processing and for the high-speed location of blocks of characteristics stored in the data file storage zone of a working storage device, and more particularly to such systems in which the blocks of characteristics are several bytes in length.

2. The Prior Art

In many applications of microcomputer systems, such as radio switching, it is expedient to work with blocks of characteristics. In a radio switching system, each subscriber is assigned a specific combination of signals (representative of letters and numerals) which is stored as a characteristic block. On the basis of the stored characteristic blocks, it can be determined whether a given subscriber is still located within radio exchange range. If a subscriber, upon being interrogated, does not answer within a specific interval of time, his characteristic block is erased from the working storage. Naturally, it is also possible to store not only the characteristic block but also additional associated data, for example, charges. The use of characteristic blocks is in no way confined to exchange devices but is suitable for data files of all kinds.

The "Micro-Computer User's Manual SAB8085" published by Siemens, Order No. B1825.101, discloses on Pages A1-6 and A1-7 a microprocessor system with a block hunting device. Here the hunting or searching process takes place by way of a DMA (direct memory access) controller, in which the searching process involves a comparison which is carried out byte by byte. When the byte search for has been located, the comparator emits a signal which terminates the searching process. The circuit described in the Siemens publication referred to above is particularly suitable for locating blocks of characteristics in which the block is only one byte in length. If a block of characteristics comprises several bytes, the bytes must be checked individually and in turn. However, in the case of extensive data files, with characteristic blocks having a length of several bytes, the process described in the Siemens publication referred to above is not feasible, because of the excessive requirements for searching time.

BRIEF DESCRIPTION OF THE INVENTION

It is a principle object of the present invention to provide an arrangement which facilitates in rapid searching, multi-byte characteristic blocks stored in the working storage of the system.

In accordance with one embodiment of the present invention, in which the characteristic length is b bytes, and a working storage employes a width a bytes, b/a comparison stages are provided, each comparison stage having a read-write store in which a bytes of one block of characteristics are stored with the same relative address or the read-write store of each comparison stage. A search mode address control unit enables all of the bytes of a block of characteristics to be read out simultaneously from the data file storage zone of the read-write store. Each comparison stage includes a comparator for comparing inputs each having a width of a bytes, and which is supplied with both a bytes of the combination searched for, and the a bytes which are read from the read-write store. An analysis circuit is connected to all of the comparators for producing an identity signal, terminating the searched for process, when the hunted block of charateristics is located.

In the arrangement of this invention, the searching characteristic is input byte by byte into the storage stages of the read-write store. One entire block of characteristics is always read out from the data file storage zone, and all of the bytes of this block are compared simultaneously so that the searching process proceeds at an optimum speed. The storage zone which is not required for the data file can be used as a conventional working store (or read-write store) and may be organized to read and write data having a width of one byte or several bytes.

In a particularly advantageous embodiment of the present invention, the first input of the comparator is connected to the data bus through a storage stage having a width of a bytes, with a second input of the comparator being connected through a storage bus to the data port of the read-write store, with a bus separator stage interconnecting the storage bus with the data bus. During the searching process, the bus separator stage is switched to a high-impedance (three state) state by a searching mode signal on a control line.

The arrangement of the present invention is characterized by relatively low complexity and cost. All of the comparators are of identical construction. The searching combinations are written into the storage stages only once, before the start of the searching process. The bus separator stage serves to cut off the read-write storage from the data bus for the duration of the searching process.

It is expedient to provide a searching mode address control unit having address inputs connected over an auxiliary address bus to the highest value bits of the storage device address lines, and a control line from the searching mode address control unit to the selection inputs (CS or chip select inputs) of the read-write stores, so that all of the read-write stores within the data file storage zone are activated during the searching process. This facilitates the conventional addressing of the read-write stores and simultaneous read out of all bytes within a characteristic block with the same address.

These and other objects and advantages of the present invention will become manifest by review of the following description and accompanying drawings.

BRIEF DESCRIPTION OF THE DRAWINGS

Reference will now be made to the accompanying drawings in which:

FIG. 1 is a functional block diagram illustrating a preferred embodiment of the present invention;

FIG. 2 is a functional block diagram of a microcomputer circuit incorporating the present invention; and FIGS. 3 and 4 are diagramatic illustrations of two different organizations of the working store used in connection with the present invention.

DESCRIPTION OF THE PREFERRED EMBODIMENT

FIG. 2 represents a microcomputer system containing a microcomputer COM. The microcomputer COM comprises a microprocessor CPU having a program store, and also includes a direct memory access controller DMA-C which is connected to a data bus DAB and an address bus ADB. The microprocessor CPU may be a model number 8085, available from a number of manufacturing sources, and the DMA controller may be a number model AM 9517, marketed by Advanced Micro Devices of Sunnyvale, Calif. The arrows on the data bus DAB and the address bus ADB indicate that further modules, such as input/output modules, are connected to the microcomputer COM. The control bus, conventional in microcomputer systems, is not illustrated in FIG. 2 for reasons of clarity, but is shown in FIG. 1 at STB.

Also connected to the data bus DAB and the address bus ADB is the storage arrangement STA, which serves as the data file and working storage for the microcomputer system COM.

The organization of the storage arrangement STA is illustrated in FIG. 1. As shown in FIG. 1, the storage arrangement STA contains four comparator stages VST1 to VST4. As the contents of all comparator stages are identical, only VST1 is shown in detail. VST1 incorporates a random access memory RAM1 as a working store, and FIGS. 3 and 4 illustrate two different organizations of data within the working store.

As shown in FIG. 3, the working store consists of four read-write stores RAM1 to RAM4. Each of the read-write stores, as illustrated in FIG. 3, has a storage zone of 4k.1 byte, in which k equals 1024. Thus, the complete storage zone has a capacity of 16k.1 byte.

In the arrangement of FIG. 3, a block of characteristics KBL has a width b equal to four bytes, and the read-write stores RAM1 - RAM4 are each one byte in width. Consequently the working store SPA which is required, viz, b/a, equals four zones, each of which corresponds to one storage module as shown in FIG. 3. FIG. 3 illustrates a data file storage zone DSB occupying 2k bytes of each of the RAMs, for a total of 8k bytes. The conventional working store ASB occupies the remainder of FIG. 3.

The 4k bytes of each storage module RAM1-RAM4 of FIG. 3 are addressed with the relative addresses 0–4k-1. The four storage modules are differentiated by CS (chip select) selector inputs, or by corresponding additional address inputs which can serve the CS function. In the arrangement of FIG. 3, the modules are selected by means of the two lowest value bits of the storage address, by use of a simple one-out-of-four decoder circuit. Thus, the first byte of the first read-write store RAM1 is addressed by 0 (0 . . . 00), the first byte of the second read-write store RAM2 is addressed by 1 (0 . . . 01), the first byte of the third read-write store RAM3 is addressed by 2 (0 . . . 10), and so on to the last byte of the data file storage zone DSB which has address 8k-1.

When all of the read-write stores RAM1-RAM4 are activated simultaneously by means of their selector inputs CS, ignoring the two lowest order bits of the address, all of the bytes of the read-write stores RAM-1-RAM4 can be read out simultaneously, so that a four byte characteristic can be read simultaneously from RAM1-RAM4.

The read out of consecutive characteristic blocks necessitates, since the two lowest address bits are ignored, an address increase of four, which may be easily arranged either by hardware or by programming. The conventional working storage zone ASB, having addresses 8k to 16k-1, is addressed in the same manner, except that conventionally only one of the read-write stores RAM1-RAM4 is addressed at any given time, the read out of a single byte onto the data bus DAB.

In the arrangement of FIG. 4, like the arrangement of FIG. 3, the first 8k-1 bytes are devoted to the data file storage zone DSB, with the remaining locations devoted to the conventional working storage zone ASB. The storage locations of the data file storage zone of RAM1 are addressed consecutively from 0 to 2k-1, and the corresponding part of RAM2 is addressed by 2k to 4k-1. The address range of the third read-write store RAM3 is addressed by 4k through 6k-1, and the corresponding sections of RAM4 are addressed with 6k to 8k-1. It can be seen that the addresses of the 4 bytes of a block of characteristics KBL each differ by 2k.

The addresses of the conventional working storage zone ASB extend from 8k to 16k-1, with the storage locations in RAM1 addressed from 8k to 10k-1, and the other RAMs being similarly organized. Thus, in each of the RAMs, it is possible to reach 2k consecutive bytes in each module.

If the higher value bits of the store address are ignored, the same relative address, constituting the lower order bits, is common to corresponding bytes stored in each of the read-write stores RAM1-RAM4. Thus, by addressing the read-write stores only with their lower order bits, and ignoring the higher order bits, corresponding bytes of each read-write memory may be read out simultaneously.

A code converter may be used to convert the store addresses into the addresses for the storage modules, so that the higher order bits can be ignored. In addition, the third highest value bit must be recoded for the storage module addressing if the working store is to operate with continuous addresses. It will be apparent from FIG. 4 that the third highest value bit of the relative storage module address differs between the first 2k and the second 2k range in each storage module.

It is, of course, also possible to divide up the storage zones differently. For example, the data file storage zone can equally be located in that area of the storage modules which can be approached with higher value addresses. Also, for example, the first 4k bytes of the first read-write store RAM1 and the last 2k bytes of the second read-write store RAM2 can be used for the data store if desired. However, this necessitates an unnecessarily complicated code converter for the address conversion. It is also possible to use a separate read-write storage module for the data file zone and for the working store zone. This would correspond to the example of FIG. 4 in which each read-write storage device RAM1-RAM4 consists of two storage modules, each with 2k bytes. In such an arrangement, only the selected inputs CS need be directly connected to the storage module via its corresponding coder device, and the address input need not be so connected.

FIG. 1 illustrates a detailed block diagram of the storage arrangement STA, when the arrangement of FIG. 4 is used. The first read-write store RAM1, which is contained within the first comparator stage VST1, has its address inputs connected to the address bus ADB. The three highest value bits of the address bus are connected to the address inputs of a searching mode address control unit SAS1 through an auxiliary address bus HDB. The address recoding which is required when a single storage module is used for a read-write store, is indicated by a broken line leading from a further output of the hunting mode address control unit to the highest order bit of the address input of the storage module RAM1. A searching mode control line STS is connected to a second input of the hunting mode address control unit ASA1 to supply a searching mode signal SMO. The output of the first hunting mode address control unit SAS1 is connected to the selected inputs CS of the first read-write store RAM1. The read control input RD and the write control input WR of the first read-write store RAM1 are connected by controllers STR and STW respectively to the control bus STB. The data port (data bus connection lines) of the first read-write store RAM1 is connected by a storage bus SPB1 to a first comparator COM1 and to a first bus separation stage BTS1. The storage bus SPB1 is connected to the data bus DAB through the first bus separation stage BTS1. All the control lines STS, STR, and STW are connected to control inputs of the bus separation stage BTS1. The data bus DAB is connected to a second input of the comparator COM1 through a first storage stage LA1 having a width of one byte. The bus separation stage BTS1 also has a width of one byte.

The write control line WST is connected to a control input ES of the first storage stage LA1. The control input ES logic linked to the enable input EN which is in turn connected by a store control line STL1 with the control bus STB. The storage stages such as LA1 are loaded selectively by a write signal over the control line STW. For effective addressing the store control line STL1 can also be replaced by the higher value address bits or by the selector input CS of the associated read-write stores.

The output of the first comparator COM1 is connected to a first input of an AND gate UN. The other comparator stages VST2–VST4 are of identical construction. They differ merely as regards the coding of the assigned hunting mode address control unit SAS, so that the required signals can be furnished for the required higher order address bits of the read-write store for each of the comparator stages, when a searching mode signal is received on the line STS, so that the higher order bits on the address bus can be ignored.

The outputs of the comparator COM from each of the other comparator stages are connected to three further inputs of the AND gate UN. The AND gate UN produces an identity signal IDS at its ouput when all four inputs are simultaneously active.

In operation, the searching process proceeds as follows. First the individual bytes of a characteristic blocks searched for is written into the storage stages LA (LA1–LA4) of the comparator stages. This is carried out by using the data bus DAB and a write command which is fed over the write control line STW to the storage stages. Then the address range of the data files transferred to the DMA controller from the microprocessor CPU, in this case 0 to 2k-1.

During the searching process, a searching mode signal SMO, on the line STS causes the data bus DAB to be cut off from the storage bus SPB1 by the bus separator stage BTS1, and the searching mode address control unit SAS1 activates the CS inputs of the read-write storage modules. The higher value bits of the storage address on the address bus are ignored. All four read-write stores RAM1 to RAM4 are operated simultaneously and in the same manner. Generally speaking, the searching process commences with the address 0, such that the same address 0 is applied to all four of the read-write storage modules RAM1 to RAM4, and each storage modules furnish the byte stored at the first or lowest order location over its storage buses SPB1 to the second input of its respective comparators COM1 to COM4. The read out takes place when a read control signal is applied over the read control line STR to the read-write stores. If no identity signal IDS is produced at the AI output of the AND gate UN, indicating that the characteristic blocks searched for has not been read out, the address is increased by the DMA controller and a new address is supplied to the read-write stores RAM1 to RAM4 over the address bus ADB, and the control signal on the line STR causes the following block to be read out. This process is repeated until all of the comparators report identity between the bytes which are stored in the intermediate stores LA1 to LA4, with the bytes read from the read-write stores, or until the given address range has been overshot. When the identity signal IDS is produced by the AND gate UN, the searching process is terminated.

During the searching process, only the normal operation of the DMA controller DMA-C is required, and so its operation need not be described in detail. The automatic increase in addresses when no identity signal IDS is produced is accomplished in a conventional manner. Similarly, the termination of the searching process when the IDS signal is received, is also conventional.

During the normal usage of the read-write stores, the bus separation between the data bus DAB and the storage bus SPB is cancelled. The individual read-write stores RAM1 to RAM4 are addressed by the address bus ADB and the searching mode address control unit SAS supplies appropriate address signals which are unique for the several read-write stores RAM1 to RAM4. In this way, individual bytes can be written into and read out from both the data file storage zone DSB and the working storage zone ASB as desired.

Although the searching mode address control unit SAS may be constructed in a variety of ways, one arrangement, when the system of FIG. 4 is used, employs a decoder for decoding two of the three most significant address bits for generating a signal indicating addressing of the respective RAM module. This signal is supplied to the CS input of the RAM module through an OR gate which receives the STS line as a second input so that when SMO signal is received, the module is selected irrespective of the output of the decoder, so that all four modules are selected simultaneously. Otherwise, only the module which is addressed through the address bus is selected. With the arrangement of FIG. 4, the most significant address bit identifies whether the DSB or ASB portion of the module is addressed, and so this line is connected directly from the address bus to the most significant address bit of the RAM module (through the searching mode address control unit SAS). Since the most significant bit is always zero when the DSB section is addressed in FIG. 4, it may remain connected to the address input of the module during searching mode operations, or alternatively may be suppressed by gating it through only when the STS line manifests a non-searching signal.

It will be appreciated that various modifications and additions may be made in the apparatus of the present invention without departing from the essential features of novelty thereof, which are intended to be defined and secured by the appended claims.

What is claimed is:

1. In a microcomputer system for data processing and for searching multi-byte characteristic blocks, said microcomputer system having a working store with an area for storing data with a width of an integral number "a" bytes, said working store having a data file area for storing characteristic blocks having a data width of an integral number "b" bytes, where "b" is an integral multiple of "a", said multicomputer system having a DMA controller, and bus means including a data bus and an address bus interconnecting said DMA controller and said working store, the combination comprising;
- a plurality of comparator units, the number of which is equal to the ratio of "b"/"a";
- a plurality of read-write stores, the number of which is equal to the ratio of "b"/"a"; one of said read-write stores for each of said comparator units, each of said read-write stores containing a data file area for an integral number "a" bytes of a characteristic block, said integral number "a" bytes being stored under the same relative address in each read-write store;
- each comparator unit having means for receiving inputs with a data width of "a" bytes corresponding to the characteristic block being searched for;
- a storage bus connecting a second input of said comparator unit to its associated read-write store;
- a bus separation stage connecting said storage bus to said data bus;
- means for switching said bus separation stage to a highimpedence mode during operation of said comparator unit (during a searching process);
- a searching mode address control unit for each said comparator stage for simultaneously reading out all of the bytes of a characteristic block from said integral number "b"/"a" read-write stores; and
- an analysis circuit connected to the output of all of said comparator units for producing a match identity signal when all said comparator units recognize equality between the characteristic block being searched for and the data read from said read-write stores.

2. Apparatus as claimed in claim 1, wherein said searching mode address control unit has address inputs connected via an auxiliary address bus to at least some of the highest value bits of said address bus, a first output of said hunting mode address control unit being connected to the device selector input of the read-write store and a further input of said hunting mode address control unit being connected to the control line whereby, during the hunting process, all the read-write stores are activated simultaneously.

3. Apparatus as claimed in claim 1, wherein b/a·n (n=1, 2, 3 ...) storage modules are used for the data file storage zone of said working storage, and including separate storage modules which are provided for the conventional working storage.

4. Apparatus as claimed in claim 1, wherein said working store has a data storage width of one byte.

5. Apparatus as claimed in claim 1, wherein said analysis circuit comprises an AND gate connected to the outputs of all of said comparators.

6. Apparatus as claimed in claim 1, wherein for each read-write store, one single storage module is used, each said module having a data file zone and a working store zone, said data file zone located so as to be accessed by the lowest value addresses, and said working store zone being located to be accessed by the higher value addresses.

7. Apparatus as claimed in claim 1, including means connecting a further output of said hunting mode address control unit to the highest value address input of its respective read-write store.

* * * * *